H. SHOEMAKER & F. W. MIDGLEY.
COATED ARTICLE AND PROCESS OF MAKING SAME.
APPLICATION FILED JAN. 8, 1909.
928,074.
Patented July 13, 1909.
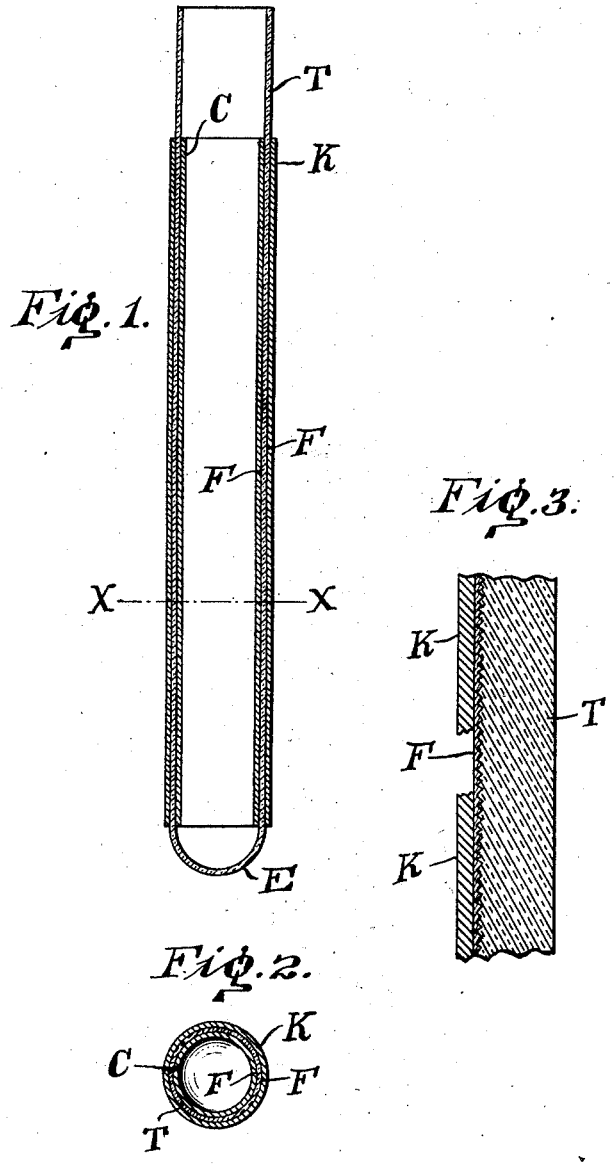

UNITED STATES PATENT OFFICE.

HARRY SHOEMAKER AND FREDERICK W. MIDGLEY, OF JERSEY CITY, NEW JERSEY.

COATED ARTICLE AND PROCESS OF MAKING SAME.

No. 928,074.            Specification of Letters Patent.            Patented July 13, 1909.

Application filed January 8, 1909. Serial No. 471,229.

*To all whom it may concern:*

Be it known that we, HARRY SHOEMAKER and FREDERICK W. MIDGLEY, citizens of the United States, residing at Jersey City, county of Hudson, and State of New Jersey, have invented new and useful Improvements in Coated Articles and Processes of Making Same, of which the following is a specification.

Our invention relates to a process for coating glass or other vitreous substance with a metal or other electrically conducting material, and relates to the coated glass or other vitreous substance.

In general, our invention resides in a process for coating glass or other vitreous material with another material, preferably metal. This process consists in roughening the surface of the glass or vitreous material, either by chemical or other means, and then subjecting the roughened surface to a metal or other brush, or the like, whereby the metal or other material of the brush or other device is worn or ground off by the roughened surface, the particles of metal or material being lodged in the hollows of the roughened surface and firmly secured therein by the brush or other device, in intimate engagement with the surface, until a complete coating is formed, and which may finally be burnished on the exposed surface. Then, upon the exposed surface of this preliminary coating may be electroplated or otherwise deposited a metallic or other coating.

In the accompanying drawing, Figure 1 is a vertical cross sectional view of one form of condenser made by our process. Fig. 2 is a horizontal cross sectional view on the line X—X of Fig. 1. Fig. 3 is a fragmentary sectional view, on enlarged scale, illustrating the glass or other material and the two coatings.

The condenser jar or tube consists of the cylindrical tube or jar T of glass or other vitreous insulating material, being closed at the lower end as shown at E. As frequently used in wireless signaling transmitting apparatus, these tubes are approximately two inches in external diameter and approximately sixteen inches in length, though it is to be understood that our invention is not limited in any way to tubes or jars of these dimensions. On the inner wall of the tube T is a coating C, whose thickness is shown exaggerated, of copper or other conducting material applied to the surface of the tube or jar by the process about to be described. And on the exterior surface of the jar or tube T is a similar coating K, also shown of exaggerated thickness, applied by the same process.

To those portions of the tube or jar T which are not to be plated or coated is applied a coating of wax or other suitable material. The exposed surfaces are then subjected to hydro-fluoric acid, or other suitable material, which acts upon the glass or vitreous material leaving a rough sharp surface, as illustrated by Fig. 3. Or the rough surface may be produced by other than chemical means. The rough sharp surface is then brought into contact with a copper or other brush, which is rotated at high speed. In consequence, copper in finely divided form is ground off of the brush by the rough sharp surface of the glass or other material, and at the same time this finely divided copper is substantially hammered into the roughened surface of the glass. By the continuous grinding, rubbing and burnishing effect on the brush, for the period of some minutes, an extremely thin film, F, (see Fig. 3) of copper or metal adheres to the glass or other material, the adhesion being very firm indeed. The copper or other coating is preferably smooth and burnished on the exposed side, that is, on the side opposite the glass or other material. And, as thus applied, this preliminary coating F adheres most firmly, and it is difficult indeed to separate the same from the surface of the glass or other material. After this preliminary coating, which covers the surface, copper or other material is electroplated on this preliminary coating to the required thickness. The result is a perfectly uniform metallic coating which is in most intimate, close and firm contact with the glass, there being no air or gas spaces between the coating and the glass. Such air or gas spaces would be detrimental, especially when the glass and coating form a condenser of wireless signaling apparatus involving high potential current.

A condenser made according to this process has long life, is satisfactory electrically, and is not so subject to breakage as in earlier forms of condensers.

The process, as hereinbefore described, is simple and by its practice, glass or other vitreous material is very cheaply and perfectly coated, and in the case of condensers, the cost is comparatively small when considering the excellence of the resulting condensers and their long life. The condenser herein illustrated is, in fact, a Leyden jar or vial, and it is to be understood that our invention is equally applicable to Leyden jars or condensers of other shapes and sizes, and that our process is applicable as well in the manufacture of coated glass or vitreous material when used for other than electrical purposes.

What we claim is:

1. The process of coating glass or other vitreous material, which comprises roughening the surface to be coated, subjecting the roughened surface to coating material, and forcing the finely divided material ground off by the roughened surface into firm and intimate contact with said roughened surface.

2. The process of coating glass or other vitreous material which comprises giving to the glass or other material a rough sharp surface, subjecting coating material to grinding action by the roughened surface, and forcing said material into firm and intimate contact with said roughened surface.

3. The process of coating glass which comprises subjecting the surface to be coated to hydro-fluoric acid to produce a roughened surface, applying coating to said surface, and forcing said material firmly and intimately into contact with said roughened surface.

4. The process of coating glass which comprises subjecting the surface to be coated to hydro-fluoric acid to produce a roughened surface, applying finely divided coating material to said surface, forcing said material firmly into close contact with the roughened surface and applying sufficient of said material to entirely cover said surface, and burnishing the exposed surface.

5. The process of coating glass which comprises subjecting the surface to be coated to hydro-fluoric acid to produce a roughened surface, applying to said surface finely divided coating material, forcing said material firmly and intimately into engagement with the roughened surface, and applying sufficient of said material to entirely cover said surface, burnishing the exposed surface, and depositing a coating upon said preliminary coating.

6. The process of coating glass which comprises subjecting the surface to be coated to hydro-fluoric acid to produce a roughened surface, applying to said surface finely divided coating material, forcing said material firmly and intimately into engagement with the roughened surface and applying sufficient of said material to entirely cover said surface, burnishing the exposed surface, and electrically depositing a coating upon said preliminary coating.

7. The process of coating glass or other vitreous material which comprises producing a rough sharp surface thereon, subjecting said surface to coating material to grind off coating material and lodge the same on said roughened surface, forcing said ground off material into firm and intimate contact with said surface, and then depositing a coating upon said preliminary coating.

8. The process of coating glass or other vitreous material which comprises producing a rough sharp surface thereon, subjecting said surface to coating material, to grind off coating material and lodge the same on said roughened surface, forcing said ground off material into firm and intimate contact with said surface, and then electrically depositing a coating upon said preliminary coating.

9. The process of coating glass which comprises subjecting the surface to be coated to hydro-fluoric acid to roughen said surface, bringing said surface into contact with relatively moving coating material, whereby coating material is ground off and forced into firm and intimate contact with said surface, and then depositing a coating upon said preliminary coating.

10. The process of coating glass which comprises subjecting the surface to be coated to hydro-fluoric acid to roughen said surface, bringing said surface into contact with relatively moving coating material, whereby coating material is ground off and forced into firm and intimate contact with said surface, and then electrically depositing a coating upon said preliminary coating.

11. As an article of manufacture, glass or vitreous material having a roughened surface, and a coating on the roughened surface formed by coating material ground off by and forced intimately and firmly into engagement with said surface.

12. As an article of manufacture, glass or vitreous material having a roughened surface, a preliminary coating formed of material ground off by and forced into firm and intimate contact with the roughened surface, and another coating deposited upon said preliminary coating.

13. As an article of manufacture, glass or vitreous material having a roughened surface, a preliminary coating formed of conducting material ground off by and forced into firm and intimate contact with the roughened surface, and another coating electrically deposited upon said preliminary coating.

In testimony whereof we have hereunto affixed our signatures in the presence of the two subscribing witnesses.

HARRY SHOEMAKER.
FREDK. W. MIDGLEY.

Witnesses:
M. F. CARROLL,
ROBERT MCCABE.